Nov. 18, 1952  R. J. MINDER ET AL  2,618,217
SIRUP AND WATER DISPENSER
Filed March 10, 1949  2 SHEETS—SHEET 1
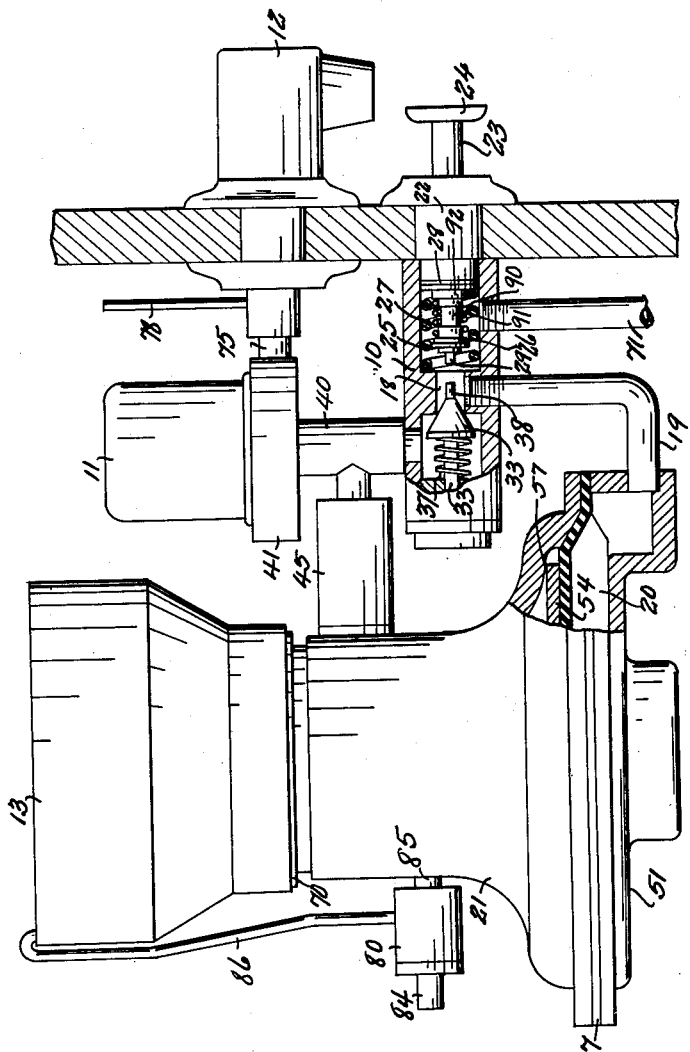
INVENTORS.
Robert J. Minder
Frank E. Fowler
BY *Victor J. Evans & Co.*
ATTORNEYS

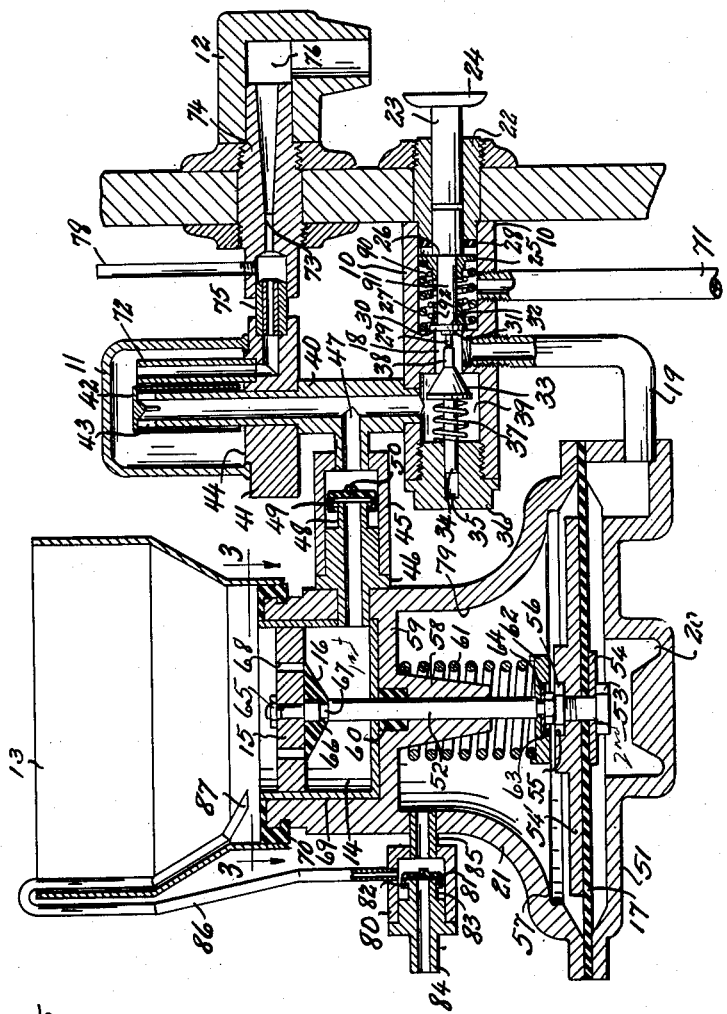
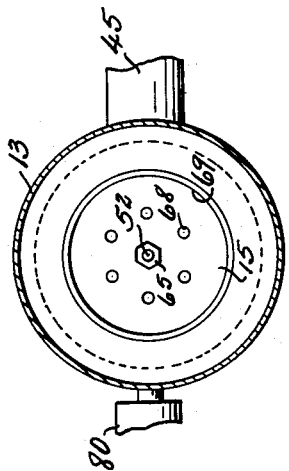
Robert J. Minder
Frank E. Fowler INVENTORS.
BY Victor J. Evans & Co.
ATTORNEYS Patented Nov. 18, 1952

2,618,217

UNITED STATES PATENT OFFICE 2,618,217

SIRUP AND WATER DISPENSER

Robert J. Minder and Frank E. Fowler, Athens, Ga.

Application March 10, 1949, Serial No. 80,688

20 Claims. (Cl. 99—275)

This invention relates to dispensing devices particularly adapted for measuring and dispensing predetermined proportionate amounts of fruit syrup and water in an aerated mixture, and in particular the invention relates to a manually actuated dispenser wherein water at tap pressure charges a measuring unit and when a button is pressed the water pressure is cut off and a measured amount of water and fruit syrup are mixed, aerated and discharged by spring pressure.

The purpose of this invention is, therefore, to provide means for dispensing measured amounts of fruit juice and water by pressing a single button.

Various types of dispensing devices have been provided where products are mixed and dispensed by turning valves or measuring the products by other means but for the usual soda fountain use it is desired to provide a single complete unit wherein both the fruit juice and water are automatically measured, mixed and dispensed without depending upon the accuracy of an operator. With this thought in mind this invention contemplates a dispensing unit including a syrup storage tank with a measuring unit below the tank, means for charging the tank by water at tap pressure and means for mixing, aerating and dispensing the syrup in combination with water when a button is pressed to cut off the water pressure.

The object of this invention is to provide mechanically operating instrumentalities in a dispensing unit whereby water pressure of the usual tap charges the unit against spring pressure and in which the spring dispenses the charged fluid and a certain amount of water as the water pressure is cut off.

Another object of the invention is to provide a dispenser for fruit syrups and water in which measured quantities of the syrup and water are violently directed against a surface of a mixing chamber wherein the products are thoroughly mixed as they are discharged from the dispenser.

Another object of the invention is to provide a fruit syrup and water dispenser wherein the products are mixed and dispensed through a venturi in which air is mixed with the product for aerating the mixture.

A further object of the invention is to provide a dispenser for measured amounts of fruit syrups and water in which the products are thoroughly mixed, aerated and dispensed by pressing a single button which is of a comparatively simple and economical construction.

With these and other objects and advantages in view the invention consists of the new and useful combination, construction, and arrangements of parts as hereinafter more fully described, set forth in the claims appended hereto, and disclosed in the accompanying drawings forming part hereof wherein:

Figure 1 is a side elevational view of the dispenser with parts broken away and shown in section and wherein the control valve is in the open or free position.

Figure 2 is a vertical longitudinal section through the dispenser showing the control valve pressed inward and with the parts in the position of dispensing the product.

Figure 3 is a sectional plan through the lower end of the syrup container taken on line 3—3 of Figure 2.

Referring now to the drawings wherein like reference characters denote corresponding parts the dispenser of this invention includes a control valve casing 10, a mixing chamber 11, a dispensing spout or nozzle 12 and a fruit juice container 13 having a measuring chamber 14 in the lower end with a piston 15 having a flap valve 16 which is actuated by a diaphragm 17.

The valve casing 10 is formed with an intermediate partition having an opening 18 therethrough and a tube 19 is threaded in the casing, providing communicating means between the opening 18 and an open area or chamber 20 in the dispenser casing 21 below the diaphragm 17.

The valve casing 10 is provided with an outer bushing 22 in which a valve stem 23 with a button 24 on the outer end is slidably mounted and the stem is provided with a washer 25 that is positioned against the shoulder 26, the washer forming a seat for a spring 27 that bears against the end of the intermediate partition of the valve casing. A packing washer 28 is provided against the washer 25 to prevent leakage through the bushing 22. The inner end of the valve stem is provided with a pin 29 on which a disk 30 is held by a pin 31 and the disk 30 is free to slide on the reduced part 91 of the stem 23, being held between the pin 31 and a shoulder 32 at the end of the stem.

A conical shaped valve 33 carried by a stem 34 in an opening 35 in a bushing 36 in the opposite end of the valve casing is resiliently held against the partition of the valve casing in which the opening 18 is provided by a spring 37. The inner end of the stem 34 is provided with a pin 38 that is positioned to be engaged by the end of the pin 29 as the stem 23 is pressed inwardly by the button 24.

The valve 33 is positioned in an opening 39 of the valve casing 10 and a passage is provided from this opening to the mixing chamber 11 through a tube 40 that extends through a base 41. A sleeve valve 42 is vertically slidable on the upper end of the tube 40 and notches 43 are provided in the sides of the tube through which products passing upwardly in the tube pass to the interior of the sleeve valve and then downwardly around the outer surface of the tube, being impinged with violence against the upper surface 44 of the base 41.

The tube 40 is connected to the measuring chamber 14 by a sleeve 45, mounted on a bushing 46 in the casing 21, and connected to the tube 40 by a nipple 47. The bushing 46 is provided with an extending inner end 48 having a flange 49 at the outer end and a rubber cup like check valve 50 is positioned on the end of the extension 48 and held over the flange 49. As pressure is applied to a fluid in the chamber 14 the valve 50 opens whereby the fluid passes into the tube 40 and is carried upwardly into the mixing chamber 11.

The casing 21 is provided with a base 51 in which the chamber 20 is positioned and the diaphragm 17 is positioned between the base and body of the casing. The diaphragm is secured on the lower end of a vertically disposed shaft 52 by a nut 53 with a washer 54 under the nut and the diaphragm is held against a disk 54' which is provided with a recess 55 in which a collar 56 on a shaft 52 is positioned. The outer peripheral edge of the disk 54 is positioned to engage a shoulder 57 on the inner surface of the casing 21 as the disk and diaphragm are moved upwardly by pressure of a fluid in the chamber 20.

The shaft 52 is vertically slidable in a hub 58 of a horizontally disposed partition 59 which has a packing element 60 therein to prevent leakage of syrup downwardly around the shaft and the shaft is resiliently held downwardly with the diaphragm in the position shown in Figure 2 by a spring 61, the lower end of which is seated on a disk 62 that is held in position by a washer 63 in an annular recess 64 in the lower part of the shaft.

The shaft 52 provides a piston rod for the piston 15 which is secured on the upper end by a nut 65 and below the piston is a soft rubber flap valve 16 that is provided with a lip 66 that is held in an annular recess 67 in the shaft. The valve 16 covers openings 68 in the piston and in the upward movement of the piston the flap valve drops away permitting syrup to pass from the container 13 into the measuring chamber 14 and then as the piston is drawn downwardly by the spring 61 the valve 16 closes the openings 68 preventing escape of the syrup through the openings and forcing the syrup outwardly through the valve 50 and into the tube 40 where it is carried upwardly into the mixing chamber 11.

The measuring chamber is formed with a cup shaped casing 69 which opens into the storage container 13 and a packing washer 70 is provided between the upper edge of the casing 69 and the lower end of the container 13.

With the parts arranged as shown in Figure 1 water at tap pressure enters the valve casing 10 through a tube 71 and passes through the tube 19 to the chamber 20 below the diaphragm 17 and, as illustrated in Figure 1 the pressure of the water holds the diaphragm upwardly with the edge of the disk 54 engaging the shoulder 57 of the casing. In this movement the piston 15 moves upward admitting syrup through the openings 68 into the measuring chamber 14 thereby charging the dispenser.

When it is desired to use syrup from the dispenser the button 24 is pressed inwardly with the disk 30 seating over the inner end of the opening 18 thereby cutting off the water supply and the pressure thereof and with continued movement of the stem the end of the pin 29 engages a pin 38 opening the valve 33. This relieves the pressure under the diaphragm whereby the spring 61 forces the diaphragm downwardly, and at the same time drawing the piston 15 downward so that the water is forced from the chamber 20 through the tube 19 and the opening 39 to the tube 40 and the syrup is forced through the valve 50 and the sleeve 45 into the tube 40 so that predetermined amounts of both water and syrup are discharged violently against the surface 44 in the mixing chamber 11.

The mixing chamber 11 is also provided with a tube 72 that is connected to a venturi passage 73 in a bushing 74 by a nipple 75 and the venturi passage communicates with an outlet passage 76 in a nozzle 12 on the outer end of the bushing. The bushing 74 is also provided with a small air inlet tube 78 through which air is drawn through the venturi providing aerating means for the mixture.

The spring chamber 79 in the casing 21 is provided with an air inlet connection through a cup 80 having a cup like check valve 81 therein which is secured over a bead 82 on an end 83 of a bushing 84 in the outer end of the cup and the cup is mounted in the casing by a nipple 85. The cup is also provided with an air tube 86 that extends upwardly over the upper edge of the syrup container 13 and downwardly inside of the container and the lower end of the tube, as indicated by the numeral 87 extends angularly to provide a swirling or mixing action in the lower end of the container to agitate syrup therein. As the spring 61 moves the diaphragm downwardly air is drawn into the chamber 79 through the valve 81 and after the dispensing action has been completed and the button 24 released the water pressure entering the chamber 20 below the diaphragm forces the diaphragm upwardly so that air in the chamber 79 is forced outward through the tube 86 and through the end 87 thereof into the syrup container.

With the dispenser in operation water pressure is continuously applied to the chamber 20 below the diaphragm so that the diaphragm is held upwardly with the spring compressed as shown in Figure 1 and when it is desired to use syrup from the dispenser it is only necessary to press the button 24 which shuts off the water pressure and as soon as the pressure below the diaphragm is relieved a spring dispenses predetermined amounts of syrup and water through the venturi and nozzle into a glass or the like.

In this operation water is shut off by the disc 30 which is held against the end of the opening 18 by a spring 90 on the reduced part 91 of the stem 23 with the spring held between the washer 25 and a similar washer 92 positioned against the disc 30.

It will be understood that modifications may be made in the design and arrangement of the parts without departing from the spirit of the invention.

What is claimed is:

1. Beverage dispensing apparatus comprising, in combination, means for receiving a quantity of one liquid, means for measuring a predetermined increment of said one liquid including a first chamber, a reciprocable piston between said liquid receiving means and said first chamber having openings therethrough directly communicating said liquid receiving means and said first chamber, valve means normally closing said openings which automatically open on movement of said piston towards said liquid receiving means when liquid is disposed therein, means for measuring a predetermined increment of a second liquid including a second chamber, means for charging said two chambers with liquids, means for discharging liquid from said chambers, means for actuating said discharge means, means for mixing the liquids discharged from said two chambers, and means for discharging the mixed liquids.

2. Beverage dispensing apparatus comprising, in combination, means for receiving a quantity of one liquid, means for measuring a predetermined increment of said one liquid including a first chamber, a reciprocable piston between said liquid receiving means and said first chamber having openings therethrough directly communicating said liquid receiving means and said first chamber, valve means normally closing said openings which automatically open on movement of said piston towards said liquid receiving means when liquid is disposed therein, means for measuring a predetermined increment of a second liquid including a second chamber, means for charging said two chambers with liquids, means for discharging liquid from said chambers, means for actuating said discharge means, means for mixing the liquids discharged from said two chambers, means for aerating mixed liquids, and means for discharging the mixed liquids.

3. Beverage dispensing apparatus comprising, in combination, a syrup receiving chamber, a syrup measuring chamber beneath said receiving chamber, a water measuring chamber, means for charging said syrup measuring chamber from said syrup receiving chamber and for discharging syrup therefrom including a piston forming at least a portion of the floor of said syrup receiving chamber and a portion of the top wall of said syrup measuring chamber, means for reciprocating said piston, means communicating said two syrup chambers, means closing said communicating means when said piston is moving in syrup discharge direction and for opening the same when said piston is moving in syrup charge direction, means for actuating said piston, means for charging said water measuring chamber, said piston actuating means being actuated upon actuation of said last-mentioned charging means, means for discharging water from said water measuring chamber, means for actuating said water discharge means and said syrup discharge means, means for mixing syrup and water discharged from said syrup and water measuring chambers, and means for discharging the mixed liquids.

4. Beverage dispensing apparatus comprising, in combination, a syrup measuring chamber, a water measuring chamber, means for charging said water measuring chamber with water under pressure, means for charging said syrup measuring chamber operative simultaneously with operation of said first-mentioned means, means for discharging said two chambers, means for actuating said discharging means including manually operable means for rendering said water charging means inoperative and for establishing communication between said water measuring chamber and a mixing chamber, means for mixing liquids discharged from said two chambers including said mixing chamber, and means for discharging the mixed liquids.

5. Beverage dispensing apparatus comprising, in combination, a syrup measuring chamber, a water measuring chamber, means for charging said water measuring chamber with water under pressure, means for charging said syrup measuring chamber operative simultaneously with operation of said first-mentioned means including a diaphragm forming at least a portion of a wall of said water measuring chamber, a piston forming at least a portion of a wall of said syrup measuring chamber and at least a portion of a syrup storage chamber adjacent said syrup measuring chamber, and means connecting said diaphragm and piston for simultaneous movement, means for discharging said two chambers, means for actuating said discharging means, means for mixing liquids discharged from said two chambers, and means for discharging the mixed liquids.

6. Beverage dispensing apparatus comprising, in combination, a syrup measuring chamber, a water measuring chamber, means for charging said water measuring chamber with water under pressure, means for charging said syrup measuring chamber operative simultaneously with operation of said first-mentioned means including a diaphragm forming at least a portion of a wall of said water measuring chamber, a piston forming at least a portion of a wall of said syrup measuring chamber and at least a portion of a syrup storage chamber adjacent said syrup measuring chamber, means connecting said diaphragm and piston for simultaneous movement, means for discharging said two chambers including a spring which returns said diaphragm to discharge water upon release of pressure within said water measuring chamber, means for actuating said discharging means, means for mixing liquids discharged from said two chambers, and means for discharging the mixed liquids.

7. Beverage dispensing apparatus comprising, in combination, a syrup measuring chamber, a water measuring chamber, means for charging said water measuring chamber with water under pressure, means for charging said syrup measuring chamber operative simultaneously with operation of said first-mentioned means, means for discharging said two chambers, means for actuating said discharging means including water passageways to said water measuring chamber and to discharge and a pair of valves controlling said passageways, one of said valves normally closing the passageway to discharge and said other valve normally being open to permit communication between a source of water under pressure and said water measuring chamber, and including manually actuable means for effecting reversal of operative positions of said valves to close off water communication with said water measuring chamber and to render said discharging means effective, means for mixing liquids discharged from said two chambers, and means for discharging the mixed liquids.

8. Beverage dispensing apparatus comprising, in combination, a syrup measuring chamber, a water measuring chamber, means for charging said water measuring chamber with water under pressure, means for charging said syrup measuring chamber operative simultaneously with operation of said first-mentioned means including a diaphragm forming at least a portion of a wall of said water measuring chamber, a piston forming at least a portion of a wall of said syrup measuring chamber, means connecting said diaphragm and piston for simultaneous movement, means for discharging said two chambers including a spring which returns said diaphragm to water discharged position upon release of pressure within said water measuring chamber, means for actuating said discharging means including water passageways to said water measuring chamber and to discharge and a pair of valves controlling said passageways, one of said valves normally closing the passageway to discharge and said other valve normally being open to permit communication between a source of water under pressure and said water measuring chamber, and including manually actuable means for effecting reversal of operative positions of said valves to close off water communication with said water measuring chamber and to render said discharging means effective, means for mixing liquids discharged from said two chambers, and means for discharging the mixed liquids.

9. Beverage dispensing apparatus according to claim 8 and including means for aerating the mixed liquids before discharge.

10. Beverage dispensing apparatus comprising, in combination, means for receiving a quantity of one liquid, means for measuring a predetermined increment of said one liquid including a first chamber, means for measuring a predetermined increment of a second liquid including a second chamber, means for charging said two chambers with liquids, means for discharging liquid from said chambers, means for actuating said discharge means, means for introducing air into said one liquid receiving means to agitate the contents thereof, said air introducing means being actuated by said charging and discharging means, means for mixing the liquids discharged from said two chambers, and means for discharging the mixed liquids.

11. Dispensing apparatus comprising, in combination, a syrup storage chamber, a syrup measuring chamber adjacent thereto, a reciprocable piston forming at least a part of a wall of both chambers, ports in said piston, flexible members normally closing said ports, a water measuring chamber spaced from said syrup measuring chamber, a flexible diaphragm forming at least a part of a wall of said water measuring chamber, a shaft positively connecting said piston and diaphragm for simultaneous movement, spring means biasing said diaphragm inwardly in respect to said water measuring chamber, said spring means being of sufficient power to discharge both measuring chambers upon relief of water pressure within said water measuring chamber, a charging passageway for communicating said water measuring chamber with a source of water under pressure, a mixing chamber, a diaphragm passageway leading from said charging passageway into said mixing chamber, a valved passageway between said syrup measuring chamber and said mixing chamber, a spring biased valve normally closing said discharge passageway at its juncture with said charging passageway, a reciprocable member including an externally disposed operating portion and an internally disposed portion engageable with said spring biased valve to open the same in one extreme position of movement, a valve mounted on said member engageable with a valve seat in said charging passageway to close said charging passageway upon movement of said member to said mentioned one extreme position of movement, the movement of said member mounted valve to closed position and the opening of said spring biased valve to communicate said water measuring chamber with said mixing chamber permitting said spring means to discharge syrup and water from said measuring chambers to said mixing chamber, and aerating means between said mixing chamber and a point of dispensing of the mixed liquids.

12. Beverage dispensing apparatus comprising, in combination, a syrup measuring chamber, a syrup storage chamber adjacent thereto, a water measuring chamber, means for communicating said water measuring chamber with a source of water under pressure, movable means for charging said syrup measuring chamber from said syrup storage chamber including a reciprocable piston having ports communicating said syrup measuring and storage chambers adapted to charge said syrup measuring chamber during movement in one direction and flexible means normally closing said ports movable into open relation with said ports during charging movement of said piston, means for actuating said movable means to charge said syrup measuring chamber, means for discharging said two measuring chambers, means for rendering said measuring chambers discharging means effective, and means for discharging syrup and water from said apparatus as a mixed potable beverage.

13. Beverage dispensing apparatus comprising, in combination, a syrup measuring chamber, a syrup storage chamber adjacent thereto, a water measuring chamber, means for communicating said water measuring chamber with a source of water under pressure, movable means for charging said syrup measuring chamber from said syrup storage chamber, means for actuating said movable means to charge said syrup measuring chamber, means for discharging said two measuring chambers, means for rendering said measuring chambers discharging means effective, means for discharging syrup and water from said apparatus as a mixed potable beverage including a mixing chamber having means for introducing syrup and water thereinto at a low level and means for conducting mixed syrup and water therefrom at a high level.

14. Beverage dispensing apparatus comprising, in combination, a syrup measuring chamber, a syrup storage chamber adjacent thereto, a water measuring chamber, means for communicating said water measuring chamber with a source of water under pressure, movable means for charging said syrup measuring chamber from said syrup storage chamber, means for actuating said movable means to charge said syrup measuring chamber, means for discharging said two measuring chambers, means for rendering said measuring chambers discharging means effective, means for discharging syrup and water from said apparatus as a mixed potable beverage including a mixing chamber having means for introducing syrup and water thereinto at a low level and means for conducting mixed syrup and water therefrom at a high level, and means for aerating the mixed liquids prior to discharge.

15. Beverage dispensing apparatus comprising, in combination, a syrup measuring chamber, a syrup storage chamber adjacent thereto, a water measuring chamber, means for communicating said water measuring chamber with a source of water under pressure including a passageway and a normally closed valve forming a part of a wall of said passageway, said valve being biased into closed position under a pressure greater than the water pressure for charging said water measuring chamber, said valve being yieldable to bypass water upon pressure being applied thereto in a predetermined amount greater than the operating water pressure, movable means for charging said syrup measuring chamber from said syrup storage chamber, means for actuating said movable means to charge said syrup measuring chamber, means for discharging said two measuring chambers, means for rendering said measuring chambers discharging means effective, and means for discharging syrup and water from said apparatus as a mixed potable beverage.

16. Beverage dispensing apparatus according to claim 14 in which said means for rendering said measuring chambers discharging means effective includes a reciprocable member, a valve mounted on said member for movement therewith, said member mounted valve being disposed in said passageway of said communicating means and cooperative with a seat forming part of said passageway, a portion of said member extending beyond said valve and being engageable with said normally closed valve to open the same upon movement of said member to one extreme position of movement determined by engagement of said member mounted valve with the seat in the passageway.

17. Beverage dispensing apparatus comprising, in combination, means for receiving a quantity of one liquid, means for measuring a predetermined increment of said one liquid including a first chamber adjacent said receiving means, a reciprocable piston between said first chamber and said receiving means movable into said first chamber for discharging liquid therefrom including passages therethrough communicating said first chamber and said receiving means for charging said first chamber from said receiving means, means closing said passages when said piston is reciprocated to discharge liquid from said first chamber, said closing means opening upon reciprocation of said piston in the opposite direction to charge the first chamber with liquid from said receiving means when the latter contains liquid, means for measuring a predetermined increment of a second liquid including a second chamber, means for charging said second chamber with liquid, means for discharging liquid from said second chamber, means for actuating said piston and said liquid discharging means to discharge liquids from said first and second chambers, means for receiving and mixing the two discharged liquids, and means for discharging the mixed liquids from said apparatus.

18. Beverage dispensing apparatus according to claim 17 in which said liquid receiving means, said first chamber, and said second chamber are in alignment, thereby providing a compact assembly.

19. Beverage dispensing apparatus according to claim 17 in which said first and second chambers are in alignment and in which said means for discharging liquid from said second chamber includes a diaphragm forming at least a portion of a wall of said second chamber, and means connecting said piston and said diaphragm for simultaneous reciprocating movement.

20. Beverage dispensing apparatus according to claim 17 in which said means for charging said second chamber with liquid includes a connection between said second chamber and a source of liquid under pressure, normally open valve means disposed in said connection, and manually operable means for closing said valve means comprising a portion of said actuating means.

ROBERT J. MINDER.
FRANK E. FOWLER.

REFERENCES CITED

The following references are of record in the file of this patent:

UNITED STATES PATENTS

| Number | Name | Date |
|---|---|---|
| 992,166 | Cornish | May 16, 1911 |
| 1,759,735 | Derossi | May 20, 1930 |
| 1,770,512 | De Whalley | July 15, 1930 |
| 1,861,227 | Patterson et al. | May 31, 1932 |
| 1,912,171 | Austin | May 30, 1933 |
| 2,427,429 | Waite et al. | Sept. 16, 1947 |